US006974076B1

(12) United States Patent
Siegel

(10) Patent No.: US 6,974,076 B1
(45) Date of Patent: Dec. 13, 2005

(54) PORTABLE MUSIC PLAYER WITH PAY PER PLAY USAGE AND METHOD FOR PURCHASE OF CREDITS FOR USAGE

(75) Inventor: Jaime A. Siegel, Ridgewood, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 760 days.

(21) Appl. No.: 09/691,409

(22) Filed: Oct. 18, 2000

Related U.S. Application Data

(60) Provisional application No. 60/182,400, filed on Feb. 14, 2000.

(51) Int. Cl.[7] ............................................... G06K 5/00
(52) U.S. Cl. ...................... 235/380; 235/379; 235/235; 235/381; 235/383
(58) Field of Search ................................ 235/375, 380, 235/792, 383; 455/3.01, 3.06; 705/51, 54, 705/52, 75

(56) References Cited

U.S. PATENT DOCUMENTS

| | | | | |
|---|---|---|---|---|
| 4,614,144 A | * | 9/1986 | Sagara et al. ................ 235/375 |
| 5,264,689 A | * | 11/1993 | Maes et al. ................... 235/492 |
| 5,619,247 A | | 4/1997 | Russo |
| 5,619,570 A | | 4/1997 | Tsutsui |
| 5,742,893 A | * | 4/1998 | Frank ......................... 455/3.05 |
| 5,769,269 A | * | 6/1998 | Peters ............................ 221/7 |
| 5,775,995 A | | 7/1998 | Okamoto |
| 5,790,937 A | | 8/1998 | Gutle |
| 5,835,595 A | | 11/1998 | Fraser et al. |
| 5,862,299 A | | 1/1999 | Lee et al. |
| 5,889,860 A | | 3/1999 | Eller et al. |
| 5,896,200 A | * | 4/1999 | Shu .............................. 356/614 |
| 5,914,941 A | * | 6/1999 | Janky .......................... 370/313 |
| 5,953,005 A | * | 9/1999 | Liu ........................... 715/500.1 |
| 5,959,945 A | * | 9/1999 | Kleiman ..................... 455/3.06 |
| 5,963,909 A | | 10/1999 | Warren et al. |
| 5,986,200 A | * | 11/1999 | Curtin .......................... 84/609 |
| 5,991,399 A | | 11/1999 | Graunke et al. |
| 6,005,935 A | | 12/1999 | Civanlar |
| 6,016,348 A | | 1/2000 | Blatter et al. |
| 6,025,868 A | * | 2/2000 | Russo .......................... 725/104 |
| 6,061,306 A | * | 5/2000 | Buchheim ...................... 369/2 |
| 6,185,035 B1 | * | 2/2001 | Otsuki et al. ................ 359/368 |
| 6,192,340 B1 | * | 2/2001 | Abecassis ................. 455/185.1 |
| 6,212,138 B1 | * | 4/2001 | Kalis et al. ............... 369/30.06 |
| 6,336,219 B1 | * | 1/2002 | Nathan ......................... 725/91 |
| 6,385,596 B1 | * | 5/2002 | Wiser et al. ................... 705/51 |
| 6,398,245 B1 | * | 6/2002 | Gruse et al. ................. 280/228 |
| 6,425,018 B1 | * | 7/2002 | Kaganas et al. ............... 710/1 |
| 6,628,963 B1 | * | 9/2003 | Chung ......................... 700/94 |
| 2002/0013771 A1 | * | 1/2002 | Blackson et al. ............. 705/43 |

* cited by examiner

*Primary Examiner*—Ahshik Kim
(74) *Attorney, Agent, or Firm*—Miller Patent Services; Jerry A. Miller

(57) ABSTRACT

A portable content playback device that includes the ability to accept a media with electronic playback credits, i.e. a smart card, that is pre-loaded with credits. Alternatively, the device may have internal memory that is capable of storing electronic credits. Consequently, when a user plays the content that is protected so that it may only be played only in a "pay per play" application credits are deducted from the media that manages the amount of electronic credits available to the user.

45 Claims, 3 Drawing Sheets

PORTABLE MUSIC PLAYER WITH PAY PER PLAY USAGE AND METHOD FOR PURCHASE OF CREDITS FOR USAGE

CROSS REFERENCE TO RELATED DOCUMENTS

This application claims priority of provisional application Ser. No. 60/182,400, filed Feb. 14, 2000 entitled "Portable Content Player with Pay-Per-Play Usage and Method for Purchase of Credits for Usage", to Jaime Siegel which is hereby incorporated herein by reference.

FIELD OF THE INVENTION

This invention relates generally to the field of music players. More particularly this invention relates to a music player such as a portable music player which includes a credit card or smart card reader that allows use of recorded media that is playable only in a pay per play format and to a method for a user to purchase credits for use of the music on the portable player.

BACKGROUND

With the advancement of E-Commerce and Electronic Music Distribution (EMD), users will purchase content over the Internet and record the content on media at their remote, or home location. One proposed business model for EMD is "pay per play." whereby a user will only pay for content to the extent that the content is played by the user. While this model may be easy to implement in the home environment, where content playback equipment can be connected through a network that monitors the number of plays, a problem is how to implement "pay per play" in the portable player environment.

For purposes of this document, the term "content" can be interpreted to mean music content, video content, computer software content, computer gaming content and similar types of content which can be downloaded from the Internet. The term "media" or "recording media" or similar terms are intended to encompass tape, disc, magnetic, optical, magneto-optical, silicon and other storage technologies which can be adapted to store digital representations of content.

SUMMARY OF THE INVENTION

The present invention relates generally to pay-per-play electronic content distribution. Objects, advantages and features of the invention will become apparent to those skilled in the art upon consideration of the following detailed description of the invention.

In certain exemplary embodiments, a content playback device includes the ability to accept a media with electronic playback credits, i.e. a smart card, that is pre-loaded with credits. Alternatively the device may have internal memory that is capable of storing electronic credits. Consequently, when a user plays the content that is protected so that it may only be played only in a "pay per play" application, credits are deducted from the media that manages the amount of electronic credits available to the user.

In one embodiment consistent with the present invention, a content player, includes a memory which stores content A playback credit bank is stored in the content player. A playback circuit plays the content for consumption by a user, providing the credit bank contains at least one playback credit. A processor deducts a playback credit from the playback credit bank when the content is played.

A method of loading playback credits into an electronic content player according to an embodiment of the invention includes electronically linking with a playback credit vendor using a communication link; purchasing playback credits via the communication link; storing playback credits on a credit storage medium; and transferring the playback credits from the credit storage medium to a playback credit bank residing in the electronic content player.

Another embodiment of the invention entails an electronic storage medium storing program instructions which, when executed on a programmed processor, carry out a process of: reading a credit bearing medium containing playback credits; transferring playback credits from the credit bearing medium to a playback credit bank; reading a content bearing medium; determining if the playback credit bank has at least one credit; if the playback credit bank has at least one credit, deducting a credit; and if the playback credit bank has at least one credit prior to the deducting, playing back the content stored on the content bearing medium.

In another exemplary embodiment, a method of playback of electronic media, includes: providing a credit bearing medium embodied as a smart card having a magnetic strip used as an interface thereto, purchasing playback credits; encrypting the playback credits; storing the encrypted playback credits to the credit bearing medium; reading a credit bearing medium containing playback credits; decrypting the playback credits read from the credit bearing medium transferring the decrypted playback credits from the credit bearing medium to a playback credit bank; reading a content bearing medium, the content bearing medium comprising a stick memory device such as a Memory Stick™; determining if the playback credit bank has at least one credit, and if so: determining if the content bearing medium is present, and providing a prompt to install the content bearing medium if the content bearing medium is not present, and when the content bearing medium is present: deducting a credit; and playing back the content stored on the content bearing medium; providing a message advising of the lack of playback credits in the event the credit bank does not have at least one playback credit.

The above examples are intended to illustrate the nature of certain exemplary embodiments and are not intended to be limiting to the scope of the invention.

DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention taken in conjunction with the accompanying drawings in which:

DETAILED DESCRIPTION OF THE INVENTION

Figure 1:
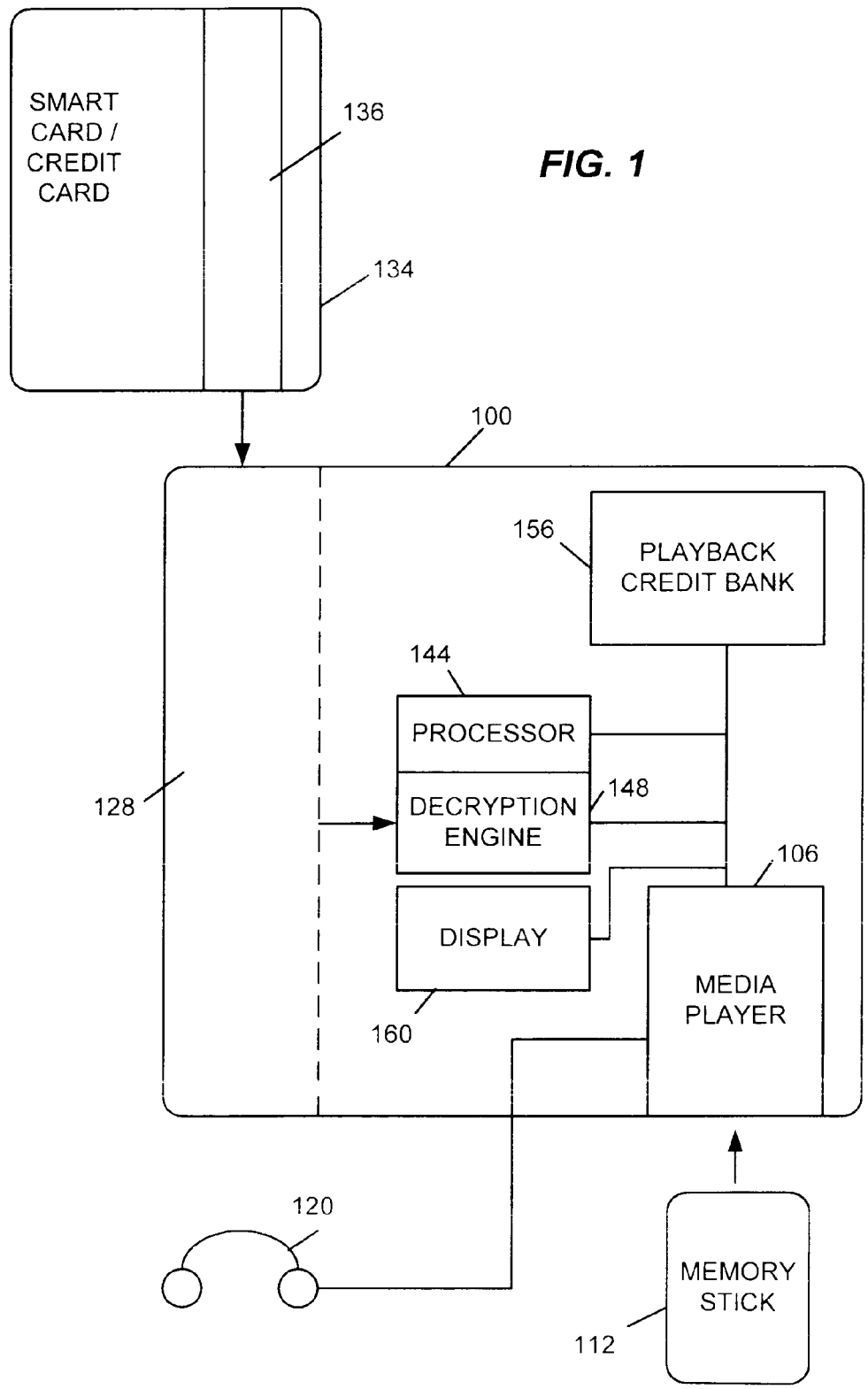
FIG. 1 is an embodiment of an exemplary portable media player consistent with the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In accordance with certain embodiments, this invention provides a portable content playback device that includes the ability to accept some form of media with electronic credits. i.e. a smart card, that is preloaded with credits. Alternatively, the device may have internal memory (a playback credit bank) that is capable of storing electronic credits. Consequently, when a user plays the content that is protected so that it may only be played only in a "pay per play" application, credits are deducted or disabled from the media that manages the amount of electronic credits available to the user. Upon use of all of the available credits, the content may or may not disappear depending upon the embodiment. Since it is contemplated that the content will employ use of a copy protect ion algorithm that prevents copying or permits access only upon payment, the credit media will contain the copy encryption "key code" for allowing access to the recorded content. The encryption can be accomplished by any known or proprietary encryption technique including public key and private key encryption or any other system known in the art.

In certain embodiments of methods for purchase of play credits, this invention provides a business model whereby a user can purchase electronic credits, either over the internet or at retail outlets that will be stored on a credit media. The credit media will also have the ability to "unlock" electronic content, for example through the provision of a "key code" that will allow for playback of the content. It is contemplated under one embodiment, that at the time of the purchase or downloading of the electronic content, a user will be able to purchase electronic credits that can be stored on a credit media. When the content is downloaded, the necessary tools for unlocking that content will also be stored on the credit media, thereby allowing for unique copy protection algorithms to be used on each piece of content. When used in combination with a portable content playback device that includes the ability to accept credit media, a user can access "pay per play" content on a portable device.

An exemplary embodiment of a portable player consistent with the invention is shown as 100 in FIG. 1. Portable media player 100 includes, in this embodiment, a media player 106 which can be any suitable media player including a disc drive, tape drive, flash memory card or stick memory device such as a Memory Stick™ (Sony Corporation, Tokyo, Japan) reader. In this example, a Memory Stick™ 112 is shown as the content bearing media which contains, for example, digital formatted music program material. Media player 106 includes all of the conventional circuitry required to effect playback of the program material in the media 112 and reproduction thereof over the headphones 120. Alternative media such as tape, disc, magnetic, optical, magneto-optical, silicon technologies such as flash memory and EEPROM memory and other storage technologies which can be adapted to store digital representations of content can also be used without departing from the invention.

Portable media player 100 also may include a media reader such as a swipe card reader 128 suitable for reading from and writing to a card similar to a credit card or smart card 134 via a magnetic stripe 136 or other interface. In this embodiment, the smart card 134 is programmed with a number of encrypted playback credits which are purchased by the user, for example, by mail or at retail outlets. In other embodiments, the card can be programmed via internet purchases or bypassed altogether as will become clear on consideration of the discussion to follow. In this embodiment, assume that the smart card is purchased with playback credits, e.g. 100 credits. When the user purchases the playback credits on the smart card 134, he or she swipes the card through swipe card reader 128 to read the content of the smart card 134, decrypt the content in a processor 144 having a decryption engine, deleting or deducting the credits from the smart card 134 and storing those credits internally in the portable media player's playback credit bank 156. Thus, in this example, after swiping the smart card 134 through the swipe card reader 128, the playback credit bank 156 is credited with the 100 playback credits previously stored thereon, so that the playback credit bank 156 now has 100 credits plus any credits already stored in the playback credit bank 156. The playback credit bank 156 is preferably a Flash memory or EEPROM device or other non-volatile memory device that can be protected and which can be written to and read numerous times. Those skilled in the art will appreciate that processor 144 may be embodied as a microprocessor or microcontroller having associated RAM and ROM operating memory storing program steps suitable for carrying out the operational functions described herein.

In other embodiments the playback credit bank 156 can be replenished from any number of sources. For example, the same media player which plays content may be employed to read the credits from credit bearing media instead of, or in addition to, content that might or might not be stored on the credit media. In this embodiment, media could be sold with a certain number of initial play credits. In other embodiments, the portable media player 100 could be directly interfaced to either a point of sale terminal or a computer connected to the Internet or to a wireless communication mechanism (e.g. Bluetooth) so that the playback credit bank can be directly replenished from an Internet or other electronic transaction. Other variations will occur to those skilled in the art without departing from the present invention.

In operation, once the playback credits are stored in the playback credit bank 156 and content bearing media 112 is accessed by the media player 106, the processor 144 checks the playback credit bank 156 prior to enabling playback of the media's content. If credits are available, one is deducted or disabled and playback is permitted. In one embodiment, the credit is deducted at approximately the time when playback begins. In other embodiments, the credit can be deducted only after, for example, ten seconds or 30 seconds of playback have been provided (e.g as a free preview). In some embodiments, a mechanism such as display 160 is provided and the programming generates a reminder as to the status of the credit bank or otherwise provides a reminder the user to renew credits. This can be accomplished, for example by providing a visual or audible message to the user indicating the number of playback credits remaining and/or a need to obtain new credits.

In another embodiment of the invention the content bearing media 112 can also serve as the storage mechanism for the playback credit bank. That is, in this embodiment, the content bearing media 112 (such as a Memory Stick™)

should be capable of being written to by the media player 106 and the media player 106 should have the ability to write to the content bearing media 112. In this manner, the content and playback credits are associated with the media rather than the player 100 permitting the media to be used for its available credits in any suitable player 100 including multiple such players.

Figure 2:
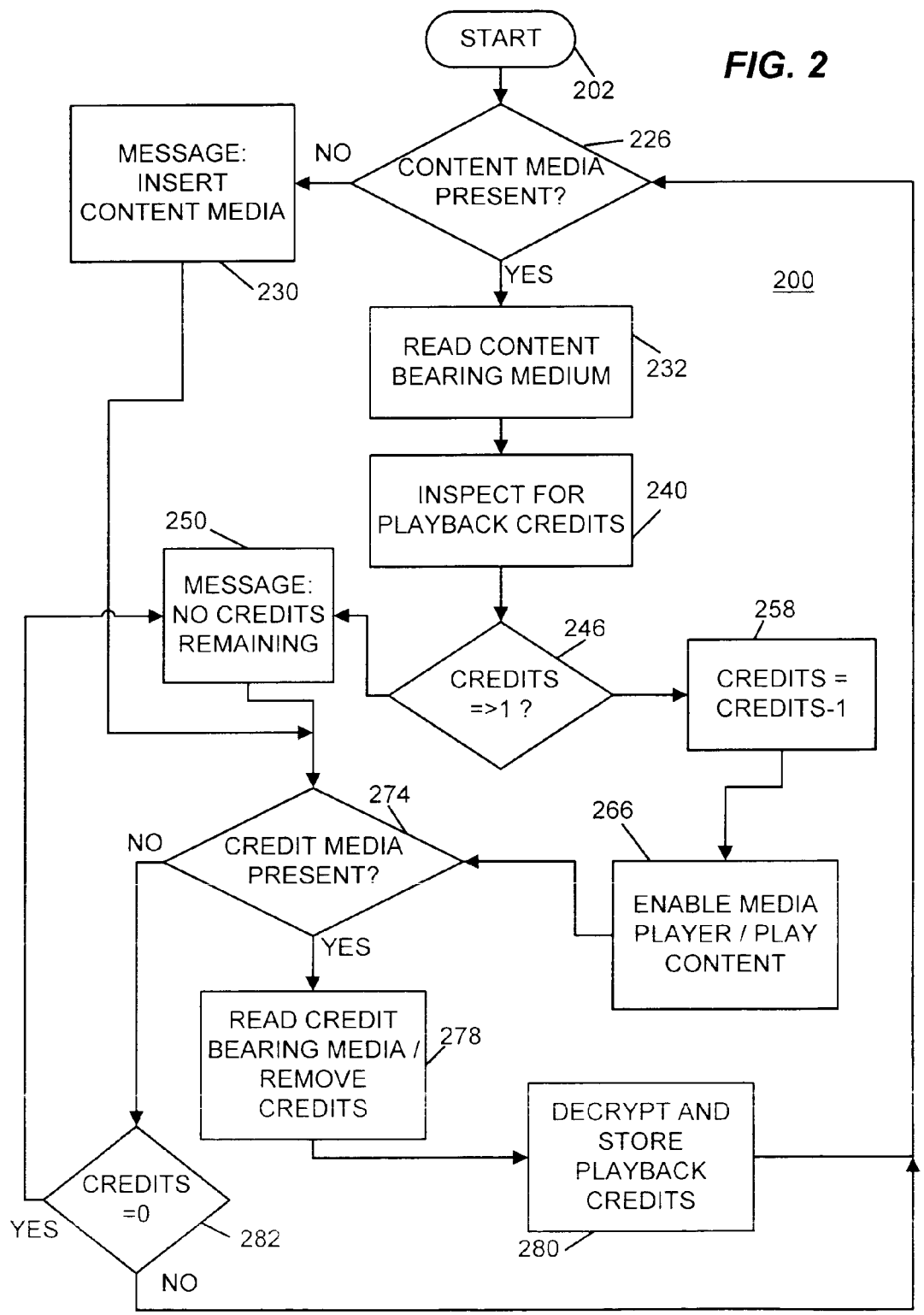
FIG. 2 is a flow chart of a method of operation of the exemplary portable media player of FIG. 1.

Referring now to FIG. 2, a process 200 for storing and using playback credits is shown starting at 202. If content bearing media is present at 226 and the user attempts to play the content, the media bearing the content is read at 232 and the processor 144 checks the playback credit bank 156 at 240 to determine if playback credits are available. If no content bearing media is present at 226, a message is displayed to insert the content media at 230 and control passes to 274 as will be discussed later. In certain embodiments, there may be several different types of playback credits which are applicable to different types of content, so it might be necessary to read the content of the media prior to determining that there are credits available at 240.

In other embodiments, only a single playback credit is used and 232 may be omitted at this stage. If there is at least one credit of the proper type at 246 the content can be played, but if not, control passes to 250 where the user is provided with an error message or other indication that there are no credits and control passes to 274 to await addition of new credits. If there is at least one credit at 246, a credit is deducted at 258 and the media player is enabled at 266 to play the content. If no credit media is present at 274 and credits are equal to zero at 282, the process returns to 250 where the user is presented with a message indicating a lack of playback credits and the process cycles through the loop of 250, 274 and 282 until playback credits are replenished by, e.g. swiping a credit card or smart card through the swipe card reader 128. If credits are not equal to zero at 282 by virtue of new credits being stored, control returns to 226 to await presence of the content media.

As previously discussed, in other embodiments, the credit may not be deducted until after the playback is enabled so the order of 258 and 266 can be changed with delays interposed without departing from the present invention. If at 274, a credit bearing media is present, the media is read at 278 and the credits are registered with the playback bank. The registration may cause the credits to be removed from the credit bearing media. These credits are decrypted and stored at 280 in the playback credit bank 156 and control returns to 227 to await the presence of content media. Alternatively, decryption may only occur upon a request to playback the content.

Figure 3:
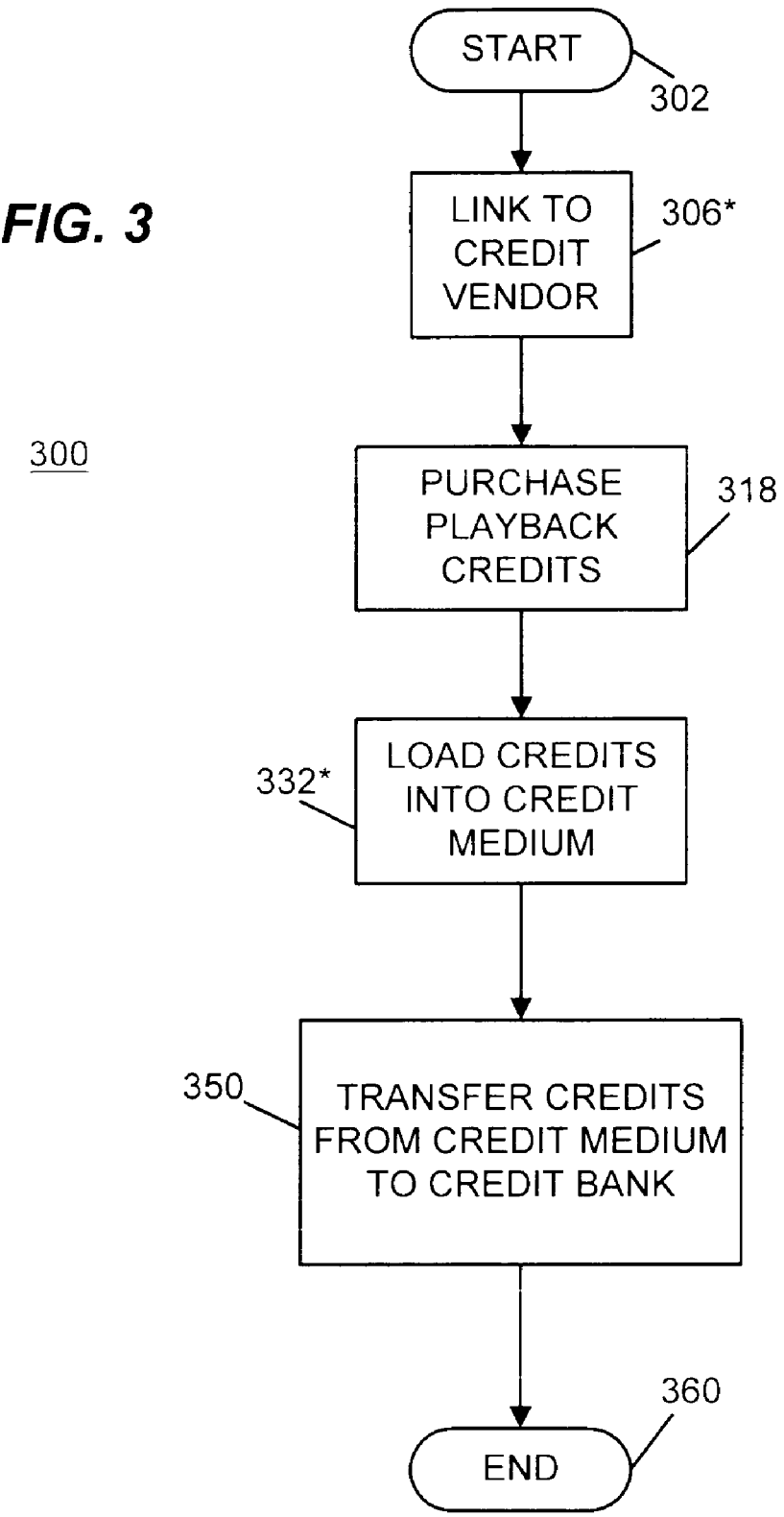
FIG. 3 is a flow chart of a method of purchasing and loading playback credits in accordance with one exemplary embodiment of the invention.

Credits may be purchased in any number of ways. For example, credits may be purchased at retail establishments or over the internet. FIG. 3 illustrates a process 300 for purchasing credits over the Internet. In this embodiment, a user logs on to a credit vendor's site at 306 and purchases playback credits via a credit card transaction or using some form of electronic cash. Credits can then be downloaded to a file which can only be successfully executed one time. That file is then loaded onto the credit bearing medium such as a smart card or Memory Stick™ at 332. The file is then transferred to the portable media player at 350 in the manner previously described. This file is executed in the portable media player 100 by processor 144 which decrypts the number of credits and loads the credits into the playback credit bank 156. In variations of this process the steps shown with a * may be omitted, such as for purchase at a retail site (where 306 is unnecessary) or where the portable media player 100 is loaded directly with the file without use of a smart card or the like as an intermediary (where 332 is unnecessary). The device itself may alternatively be connected via USB (Universal Serial Bus) wireless link (e.g. Bluetooth) or other appropriate interface to add credits.

In a variation of the present invention, decryption could occur only after stored in playback credit bank so that at no time is it possible to read decrypted data stored either in the media or the playback credit bank.

Many equivalent variations of the present invention are possible. By way of example, the content and playback credits can be stored on the same electronic medium. The content and credits can be obtained from the Internet kiosks, or any suitable vending. Credits stored on a "Bluetooth" or other wireless network enabled storage medium (with or without content) can be registered as belonging to a particular user and programmed to automatically deduct playback credits whenever they are low and in presence of an appropriately compatible Bluetooth or other wireless device. Many other variations of this invention will occur to those skilled in the art upon consideration of the present invention. Although the present invention was inspired by the difficulty in implementing pay per play in a portable music player, the invention should not be considered limited to a portable player environment since the methods and apparatus disclosed here could equally well be applied to a home or commercial audio system, without limitation.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers analog computers, dedicated processors and/or dedicated hard wired logic may be used to construct alternative equivalent embodiments of the present invention Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A content player, comprising in combination:
   a memory device which stores content;
   a playback credit bank stored in the content player;
   means for a user to install playback credits in the playback credit bank upon payment of a fee;
   a playback circuit that reads content from the memory device for consumption by the user, providing the credit bank contains at least one playback credit; and a processor which deducts a playback credit from the playback credit bank when the content is played, wherein
at least one of the memory device which stores the content and the playback credit bank comprises a user removable storage device.

2. The apparatus according to claim 1, wherein the playback credit bank is replenished by accessing a removable storage medium.

3. The apparatus according to claim 1, wherein the playback credit bank is replenished by communicating with a smart card.

4. The apparatus according to claim 1, wherein the playback credit bank is replenished by communicating with a kiosk.

5. The apparatus according to claim 1, further comprising means for advising a user of the status of credits in the credit bank.

6. The apparatus according to claim 5, wherein the means for advising comprises a display that displays a number of credits remaining in the credit bank.

7. The apparatus according to claim 5, wherein the means for advising comprises a display that displays a reminder to purchase credits.

8. The apparatus according to claim 1, wherein both the memory device which stores the content and the playback credit bank comprise a single user removable storage.

9. The apparatus according to claim 8, wherein the content player comprises a stick memory device reader and wherein the memory device is embodied in a stick memory device.

10. The apparatus according to claim 1, wherein the memory device comprises a storage medium selected from magnetic tape, magnetic disc, optical disc, magneto-optical storage and semiconductor memory.

11. The apparatus according to claim 1, wherein the content player comprises a portable music player.

12. A method of loading playback credits into an electronic content player, comprising:
electronically linking with a playback credit vendor using a communication link;
purchasing playback credits via the communication link;
storing playback credits on a user removable credit storage medium; and
transferring the playback credits from the user removable credit storage medium to a playback credit bank residing in the electronic content player.

13. The method according to claim 12, wherein the communication link comprises the Internet.

14. The method according to claim 12, wherein the communication link comprises a wireless communication link.

15. The method according to claim 12, wherein the user removable credit storage medium comprises a card having a magnetic stripe.

16. The method according to claim 12, wherein the user removable credit storage medium comprises a smart card.

17. The method according to claim 12, wherein the user removable credit storage medium comprises a storage medium selected from magnetic tape, magnetic disc, optical disc, magneto-optical storage and semiconductor memory.

18. A method of playback of electronic media, comprising:
reading a credit bearing medium containing playback credits;
transferring playback credits from the credit bearing medium to a playback credit bank;
reading a user removable content bearing medium;
determining if the playback credit bank has at least one credit;
if the playback credit bank has at least one credit, deducting a credit; and
if the playback credit bank has at least one credit prior to the deducting, playing back the content stored on the user removable content bearing medium.

19. The method according to claim 18, further comprising decrypting the playback credits read from the credit bearing medium prior to storing the playback credits to the playback credit bank.

20. The method according to claim 18, further comprising providing a message advising of the lack of playback credits in the event the credit bank does not have at least one playback credit.

21. The method according to claim 18, wherein reading the content bearing medium comprises reading a semiconductor memory device.

22. The method according to claim 21, wherein the semiconductor memory device comprises a stick memory device.

23. The method according to claim 18, wherein reading the credit bearing medium comprises reading a magnetic card stripe.

24. The method according to claim 23, wherein the card strip comprises a card stripe forming an interface to a smart card.

25. An electronic storage medium storing program instructions which, when executed on a programmed processor, carry out a process comprising:
reading a credit bearing medium containing playback credits;
transferring playback credits from the credit bearing medium to a playback credit bank;
reading a user removable content bearing medium;
determining if the playback credit bank has at least one credit;
if the playback credit bank has at least one credit, deducting a credit; and
if the playback credit bank has at least one credit prior to the deducting, playing back the content stored on the user removable content bearing medium.

26. The electronic storage medium according to claim 25, further comprising decrypting the playback credits read from the credit bearing medium prior to storing the playback credits to the playback credit bank.

27. The electronic storage medium according to claim 25, further comprising providing a message advising of the lack of playback credits in the event the credit bank does not have at least one playback credit.

28. The electronic storage medium according to claim 25, wherein reading the user removable content bearing medium comprises reading a semiconductor memory device.

29. The electronic storage medium according to claim 28, wherein the semiconductor memory device comprises a stick memory device.

30. The electronic storage medium according to claim 25, wherein reading the credit bearing medium comprises reading a card stripe.

31. The electronic storage medium according to claim 30, wherein the card strip comprises a card stripe forming an interface to a smart card.

32. The electronic storage medium according to claim 25, wherein the user removable content bearing medium comprises a storage medium selected from magnetic tape, magnetic disc, optical disc, magneto-optical storage and semiconductor memory.

33. The electronic storage medium according to claim 25, wherein the credit bearing medium comprises a storage medium selected from magnetic tape, magnetic disc, optical disc, magneto-optical storage and semiconductor memory.

34. A content player, comprising in combination:
a storage medium which stores content;
a playback credit bank stored in the storage medium;
a playback circuit which plays the content for consumption by a user, providing the credit bank contains at least one playback credit; and
a processor which deducts a playback credit from the playback credit bank when the content is played, wherein
at least one of the storage medium which stores the content and the playback credit bank comprises a user removable storage device.

35. The apparatus according to claim 34, wherein the playback credit bank is replenished by accessing a removable storage medium.

36. The apparatus according to claim 34, wherein the playback credit bank is replenished by communicating with a smart card.

37. The apparatus according to claim 34, wherein the playback credit bank is replenished by communicating with a kiosk.

38. The apparatus according to claim 34, further comprising means for advising a user of the status of credits in the credit bank.

39. The apparatus according to claim 38, wherein the means for advising comprises a display that displays a number of credits remaining in the credit bank.

40. The apparatus according to claim 38, wherein the means for advising comprises a display that displays a reminder to purchase credits.

41. The apparatus according to claim 34, further comprising a content player that reads content from the storage medium for playback.

42. The apparatus according to claim 41, wherein the content player comprises a stick memory device reader and wherein the user removable storage device is embodied in a stick memory device.

43. The apparatus according to claim 34, wherein the storage medium comprises a storage medium selected from magnetic tape, magnetic disc, optical disc, magneto-optical storage and semiconductor memory.

44. The apparatus according to claim 34, wherein the content player comprises a portable music player.

45. A method of playback of electronic media, comprising:
providing a credit bearing medium embodied as a smart card having a magnetic strip used as an interface thereto;
purchasing playback credits;
encrypting the playback credits;
storing the encrypted playback credits to the credit bearing medium;
reading a credit bearing medium containing playback credits;
decrypting the playback credits read from the credit bearing medium;
transferring the decrypted playback credits from the credit bearing medium to a playback credit bank;
reading a content bearing medium, the content bearing medium comprising a stick memory device;
determining if the playback credit bank has at least one credit, and if so:
determining if the content bearing medium is present, and providing a prompt to install the content bearing medium if the content bearing medium is not present, and when the content bearing medium is present;
deducting a credit; and
playing back the content stored on the content bearing medium;
providing a message advising of the lack of playback credits in the event the credit bank does not have at least one playback credit.

* * * * *

UNITED STATES PATENT AND TRADEMARK OFFICE
CERTIFICATE OF CORRECTION

PATENT NO. : 6,974,076 B1
DATED : December 13, 2005
INVENTOR(S) : Jaime A. Siegel It is certified that error appears in the above-identified patent and that said Letters Patent is hereby corrected as shown below:

Column 1,
Line 30, delete "play." and insert -- play, --.
Line 64, after "stores content" insert -- . --.

Column 3,
Line 16, delete "credits." and insert -- credits, --.
Line 27, delete "protect ion" and insert -- protection --.

Column 6,
Line 12, after "Internet" insert -- , --.
Line 37, after "optical computers" insert -- , --.
Line 39, after "invention" insert -- . --.

Column 7,
Line 27, after "storage" insert -- device --.

Signed and Sealed this

Twenty-first Day of February, 2006

JON W. DUDAS
*Director of the United States Patent and Trademark Office*